United States Patent [19]

Baxter

[11] Patent Number: 4,798,947
[45] Date of Patent: Jan. 17, 1989

[54] FOCUSING TECHNIQUE FOR AN OPTICAL SENSING SYSTEM

[75] Inventor: Ivor R. Baxter, Brentwood, England

[73] Assignee: The General Electric Company, p.l.c., Essex, England

[21] Appl. No.: 109,583

[22] Filed: Oct. 19, 1987

[30] Foreign Application Priority Data

Oct. 18, 1986 [GB] United Kingdom ............... 8625031

[51] Int. Cl.⁴ .................................................. G01J 1/20
[52] U.S. Cl. ..................................... 250/201; 354/405
[58] Field of Search ................ 250/201 PF; 354/402, 354/404, 405, 409

[56] References Cited

U.S. PATENT DOCUMENTS 4,267,440  5/1981  Kitai et al. ........................ 354/405
4,431,289  2/1984  Kajita et al. ..................... 354/405

Primary Examiner—Edward P. Westin
Assistant Examiner—Khaled Shami
Attorney, Agent, or Firm—Lowe, Price, LeBlanc, Becker & Shur

[57] ABSTRACT

By placing a mirror in the field of view of an infrared imager it is caused to produce an image of its own detector assembly which is correctly focussed when the lens system is focussed at infinity. This phenomenon is used either manually or automatically to focus the system.

5 Claims, 1 Drawing Sheet

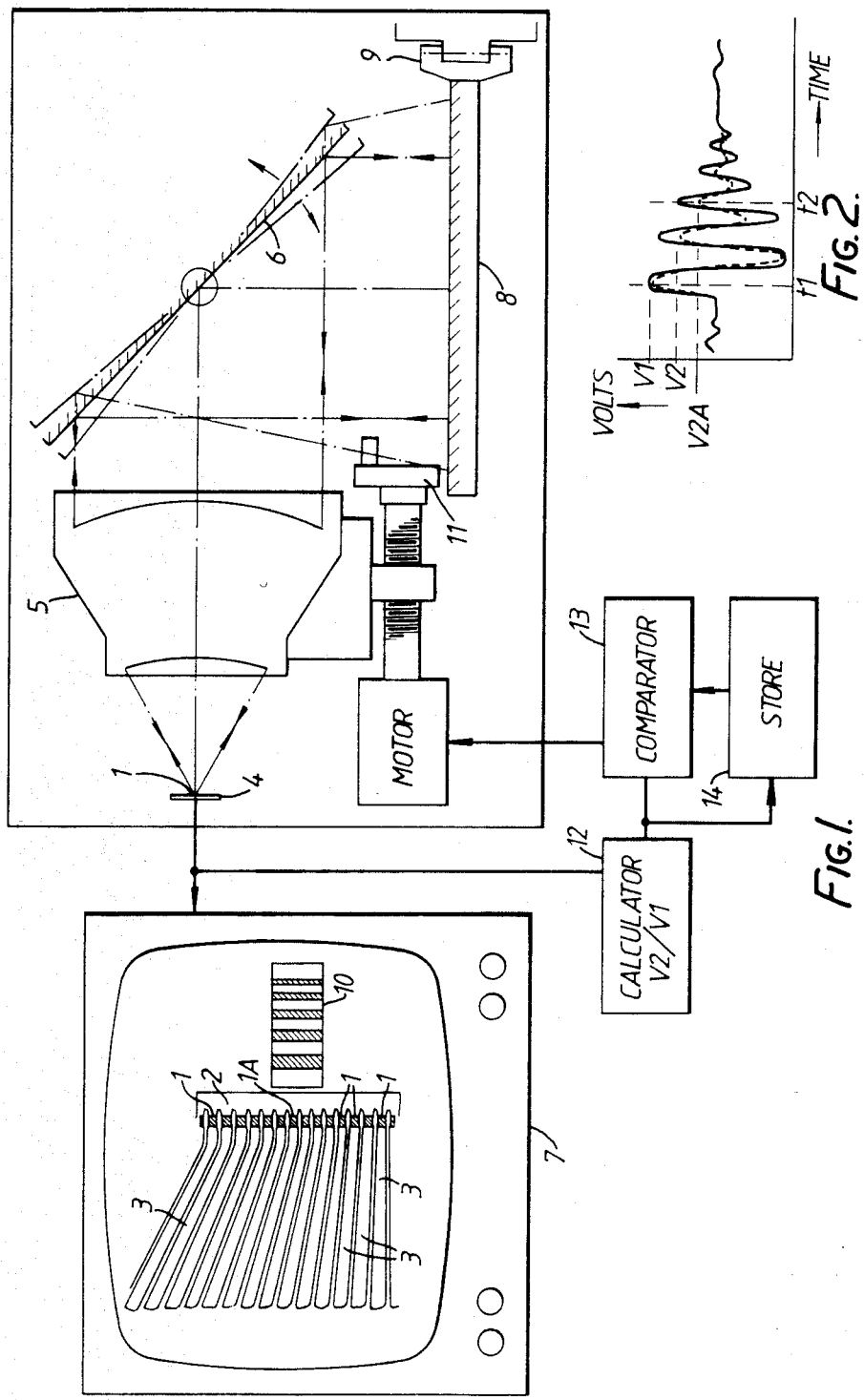

FOCUSING TECHNIQUE FOR AN OPTICAL SENSING SYSTEM

This invention relates to a focussing technique for an optical sensing system.

The invention arose as a result of experiments with an infra-red imaging system which, as is conventional, has a linear array of sensors formed on a suitable substrate, a focussing device for forming an image of a scene on the array of sensors, a scanning system sweeping the image across the array, and a display arranged to produce a visible image of the scene from the outputs of the sensors. It was noted that, when the system was correctly focussed at infinity, there appeared, on the display, interference due to infra-red emissions from the sensor assembly which were reflected from the interior surface of a window in a housing containing the optical components, back to the sensor assembly. This interference took the form of a faint image of the sensor assembly itself.

The inventor realised that this apparent problem could be employed profitably to focus the system; and accordingly the invention provides a method of focussing an optical sensing system comprising a sensor assembly, a focussing device for producing an image of a scene on the sensor assembly, and a display device for producing a visible display from an output of the sensor, the method comprising the steps of (a) placing a reflector in the field of view of the system so that radiation emitted by the sensor assembly is reflected back thereto and (b) adjusting the focussing device whilst observing the display device until an image of the sensor assembly, or of other features in the plane thereof, appears in correct focus on the display device.

The inventor further realised that this technique could be employed to effect automatic focussing of the system and thus, according to a second aspect of the invention there is provided an optical sensing system comprising a focussing device for producing an image of a scene, sensing means arranged to receive the image, means for causing radiation emitted from the plane of the sensing means, after passing via the focussing means, to be reflected back via the focussing means to the sensing means, and control means for using the resulting output of the sensing means to control the focussing means.

Although it is possible to rely upon a pattern or shape of the sensing means itself or of conductors leading to it, it is considered better to provide, in a plane of the sensing means perpendicular to the optical axis, a specially designed pattern of relatively emissive and nonemissive areas. This pattern can conveniently be formed on the substrate carrying the sensing means.

In one form of the invention the specially designed pattern includes pattern elements of progressively smaller size and/or spacing towards one end of the series so that the mean amplitude of the said characteristic output varies during a portion of the scan by an amount which is a maximum when the focussing means is correctly focussed; and in which the control means is designed to maximise the said output.

The reflector is preferably a plan mirror which is appropriate if, as is usual, it is desired to focus the system at infinity. It would however also be possible, within the scope of the invention, to use a curved reflector for the purpose of focussing the system at a point other than infinity.

One way in which the invention may be performed will now be described by way of example with reference to the accompanying drawings in which:

FIG. 1 is a schematic diagram of an infra-red imaging system constructed in accordance with the invention; and FIG. 2 illustrates in continuous lines and broken lines signals expected from an infra-red sensor of figure 1 respectively when the system is in focus and out of focus.

The illustrated system comprises a linear array of infra-red detectors 1 having a common earth connection 2 and individual signal output lines 3. The detectors 1 and the connections 2 and 3 are formed on a substrate 4.

An image of a scene to be observed is focussed by a lens system 5 onto the substrate 4 and is swept across the array of detectors 1 by a scanning mirror 6. The outputs of the detectors are passed to a display 7 synchronised with the scanning action of the mirror to produce an image of the scene within a field of view of the system.

It is normally desirable for features at infinite range to be focussed on the detector array and, even when this is not desired it may be necessary to focus the device initially at infinity to establish a datum position. When it is desired to adjust the focus, a plane mirror 8 is swivelled, on a hinge 9, to its illustrated position where it lies in the field of view. With the mirror in this position the detector array receives an image of itself (as is shown on the display 7) which is in focus when the lens is correctly adjusted. It will be noted that the array has a pattern 10 of bars of different emissivity. The bars are progressively narrower and progressively closer towards one end of the pattern.

The adjustment can be carried out subjectively by an operator using a handle or other manually manipulatable control member 11 and simultaneously viewing the display 7. The adjustment can also be performed automatically in a manner which will now be described. The output of the detector 1A as it is swept by the image of the pattern 10 is shown in FIG. 2 from which it will be noted that the mean amplitude of the signal, and the peak amplitudes, are smaller at times corresponding to the narrow bands of the pattern 10. This is because these bands, as they become narrower, approach the limit of resolution of the optical system. The limit of resolution is obviously reached more quickly when the system is out of focus than it is when it is in focus. Thus the amplitude shown in broken lines on FIG. 2 (corresponding to the out of focus condition) decays more quickly than the amplitude shown in continuous lines. Thus the ratio V2/V1 is a maximum when the image is in focus.

A calculator 12 calculates the ratio V2/V1 (where V1 is the voltage at time T1 and V2 is the voltage at time T2) and passes this ratio to a comparator 13, which also receives, from a store 14, the corresponding value derived during the previous scan. The comparator 13 performs the following operations. If the current value of V2/V1 is greater than the previous value it steps a motor 14 forward thereby driving lens 5 to the right hand side as viewed in FIG. 1. If the current value of V2/V1 is less than the previous value it steps the motor 14 back thereby driving the lens 5 to the left hand side. If the two values are equal the motor is stopped. The lens 5 thus stabilises at the position where V2/V1 is a maximum and the image is in focus. When the two values have been equal for a pre-set number of scans the comparator can be arranged to cause the mirror 8 to swivel out of the field of view or alternatively this operation can be performed manually.

I claim:

1. A method of focussing an optical sensing system comprising a sensor assembly, a focussing device for producing an image of a scene on the sensor assembly, and a display device for producing a visible display from an output of the sensor, the method comprising the steps of (a) placing a reflector in the field of view of the system so that radiation emitted by the sensor assembly is reflected back thereto and (b) adjusting the focussing device whilst observing the display device until an image of the sensor assembly, or a pattern disposed on the plane of the sensor assembly for focussing purposes, appears in correct focus on the display device.

2. An optical sensing system comprising a focussing device for producing an image of a scene, sensing means arranged to receive the image, means for causing radiation emitted from the sensing means, after passing via the focussing means, to be reflected back through the focussing device to the sensing means; and control means for using the resulting output of the sensing means to control the focussing means.

3. An optical sensing system according to claim 2 comprising a pattern of relatively emissive and nonemissive areas disposed on the plane of the sensing means for focussing purposes.

4. An optical sensing system according to claim 3 in which the said pattern comprises a series of pattern elements and in which the system includes means for scanning the image of the sensing means in a direction such as to cross the said elements to produce a characteristic output which varies periodically.

5. An optical sensing system according to claim 4 in which the pattern elements and/or the spacing therebetween are of progressively smaller size towards one end of the series so that the mean and/or peak amplitude of the said characteristic output varies during a portion of the scan by an amount which is a maximum when the focussing means is correctly focussed; and in which the control means is designed to maximise the said output.

* * * * *